Nov. 15, 1966  A. THEVENET  3,285,108
DRIVING ARRANGEMENT FOR THE THREADING TOOL OF AUTOMATIC LATHES
Filed Feb. 7, 1966

APPLICANT
Albert Thevenet
ATTORNEYS
Misegades & Douglas

United States Patent Office 3,285,108
Patented Nov. 15, 1966

3,285,108
DRIVING ARRANGEMENT FOR THE THREADING
TOOL OF AUTOMATIC LATHES
Albert Thevenet, 8 Rue Jean Baptiste Schacre,
Mulhouse, Haut-Rhin, France
Filed Feb. 7, 1966, Ser. No. 525,400
Claims priority, application France, July 12, 1963,
941,260
3 Claims. (Cl. 82—5)

The present application is a continuation-in-part of pending application Serial No. 379,895 filed July 2, 1964.

The present invention relates to a screw-threading arrangement for automatic lathes having an auxiliary shaft rotated through an interchangeable gear train by the work spindle, and rotating through appropriate transmission means, like a wheel or a worm-gear, a driving shaft and, simultaneously rotating with the driving shaft a pair of slides, one for back and forth motion of tool carrier in a direction radial to the workpiece, the other for to-and-fro movement parallel to the workpiece, having also an automatic cut depth control device to adjust cutting depth of tool before each working stroke and an automatic stop device for disengagement once desired depth is obtained. Screw-threading arrangements of a such type are well known by those skilled in the art.

Conventional screw-threading arrangements of the above type are quite unsatisfactory as it is compulsory to stop operation to proceed to gear replacement for various pitches and for either external or internal threading; slide changing according to various threading lengths is also necessary.

Changing slides substantially increases idle time for machine as well as require storage space, as many different slides are to be stored for each threading length and for either left-hand or right-hand threading.

It is an object of the present invention to substantially reduce idle time in threading operation of lathes as well as required storage space in workshops.

To overcome such inconveniences, the screw-threading arrangement according to the invention comprises a single universal control cam carrying on its periphery a first groove for radial displacement of tool carrier and, located on its front end, a second closed and partially spiral shaped groove engaging with a roller, a pin secured on a horizontally movable carriage which supports an angularly adjustable disc with a groove guiding a thimble fixed to a piston coupled to a connecting rod which is articulated with the longitudinally movable carriage.

With this arrangement, either left-hand or right-hand as well as either external or internal threading of various lengths are made possible without the inconvenience of slide changing as is the case with conventional arrangement.

The mean length of the groove located on the front end of the control cam is divided in two portions one of which has a spiral shape and is twice as long as the other portion. The longest portion corresponds to maximum thread length to be threaded.

If the lathe is to be operated selectively for external right-hand threading and internal left-hand threading or for internal right-hand threading and external left-hand threading, a lathe according to the above description is fit for such operations.

But if both external right-hand and internal left-hand threading as well as internal right-hand and external left-hand are to be performed another device according to the invention will secure the control cam in two positions in relation to the driving shaft.

The following description with reference to the accompanying drawings, filed by way of example only and not of limitation, will give a clear understanding of how the invention may be carried into practice.

Referring to the drawings filed herewith:

Figure 1:
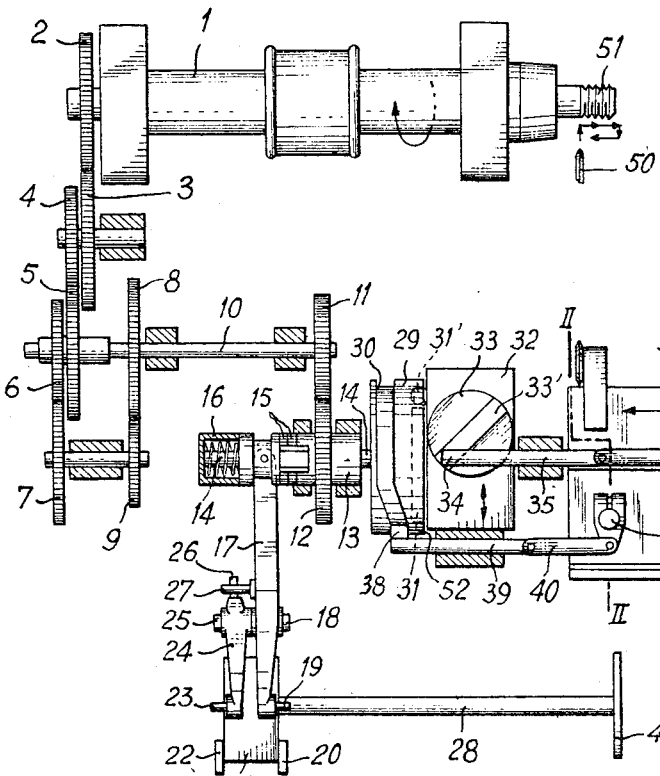
FIG. 1 is a plan view of moving members of the threading attachment adapted to a conventional type of lathe according to the invention.
Figure 2:
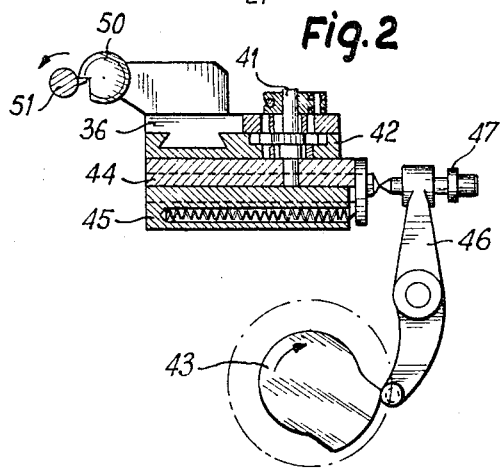
FIG. 2 is a sectional view taken through the line II—II of FIG. 1

The spindle 1 carrying the workpiece (FIGURE 1) drives through a gear train 2–3–4–5–6–7–8–9 a shaft 10. This shaft 10 drives in its turn gears 11 and 12 through a sleeve 13 in which turns without slipping a driving shaft 14.

A dog clutch 15 enables the shaft 14 to be secured for rotation with the sleeve 13. Engagement of the clutch is urged by a spring 16, but can be prevented by a lever 17 pivoted upon its axis 18 and provided at its other end with a finger 19 disposed in the path of a cam lug 20 fixed to a drum 21, which carries on its other side a second cam lug 22 acting on a finger 23 carried by a lever 24 pivoting about its axis 25 and carrying a lug 26 capable of engaging a second lug 27 carried by a boss on the lever 17. The drum 21 is mounted on the cam shaft 28 of the lathe.

When the screw-threading operation is to start, the cam lug 22 meets the finger 23 and displaces the lever 24 which unhooks the lug 27. The lever 17 being free, causes under the action of the spring 16, engagement of the dog clutch 15 and thus rotation of the driving shaft 14. When the screw-threading operation is finished, the cam lug 20 the angular position of which has been determined in an appropriate manner in relation to the cam lug 22, disengages once more the dog clutch and re-establishes the engagement of the lugs 26 and 27.

The gears 2–3–11 and 12 have a fixed ratio while the gears 4–5–6–7–8–9 are interchangeable to provide different ratios, thus enabling the ratio of the number of turns of the driving shaft 14 to the number of turns of the spindle 1 to be varied and thus to determine the number of threads for single or multi-start threads.

The arrangement as herebefore disclosed corresponds to present state of the art. It further comprises on driving shaft 14 a control cam 29 carrying on its periphery a groove 30 for radial displacement of tool carrier 42 and located on its front end a closed partially spiral-shaped groove 31, engaging a roller or pin 31', secured on a horizontally movable carriage 32. Carriage 32 has an angularly adjustable disc 33 with a guiding groove 33'.

Thimble 34 fixed to piston 35 with its articulated connecting rod 37 is guided by groove 33', connecting rod being articulated on its other end to longitudinally movable tool carrier 36.

If disc 33 is in a position as shown on drawing in relation to carriage 32, the lathe is in condition to effect external right-hand thread of maximum length. If disc 33 is turned in either direction in relation to carriage 32, threading length is adjusted to desired length.

If disc 33 is turned at a right angle from the position shown in a counter-clockwise direction in relation to carriage 32, internal left-hand thread of maximum possible length can be performed.

It is also possible to position thimble 34 at opposite end of guiding groove 33' on starting point, i.e. at beginning of thread. In such a case, control cam 29 must be positioned in relation to driving shaft 14 on its second position corresponding to return stroke of tool, with an angle value of 80° for example.

In the peripheral groove 30 is a roller 38 carried by a piston 39 which, through a connecting rod 40, drives the cam 41 for advancing or withdrawing radially movable tool carrier 42 assuring the positioning or disengagement of the threading tool which operates in one direction or the other according to whether the thread is internal or external.

Finally, on the camshaft 28 of the lathe is fixed a second driving or depth regulating cam 43. This cam is intended to position the slide 44 suitably in relation to the slideway 45 so as to determine correctly, in accordance with the diameter of the screw-thread and the number of runs, the starting point of the operations determined by the universal cam 29. Cam 43 causes forward movement of threading tool and thereby changes thread depth. Cam 43 which has to be changed in relation to workpiece diameter acts through a two armed lever 46 on tool carrier 44. A micrometer adjustment 47, accurately determines the position of the thread tool in relation to the workpiece. The cam 43 also determines the number of runs which the tool has to make.

Various means could be used for controlling exactly the inclination of the guide 33' on which depends the length of stroke of the slide 36 carrying the threading tool either by using a sinusoidal guide or by wedges between two abutments 48 and 49, one on the longitudinal slide 36 carrying the threading tool, the second on the fixed base 45.

Workpiece is designated by 51.

Figure 4:
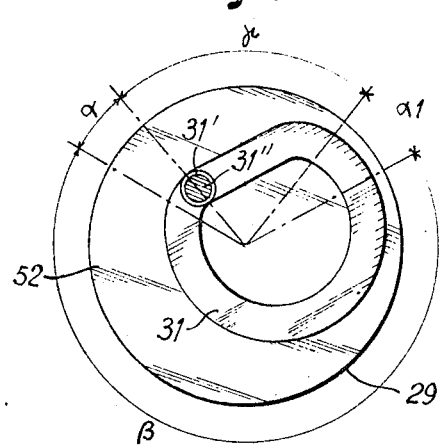
FIG. 4 is a plan view of the front end of the universal control cam according to the invention.
Figure 3:
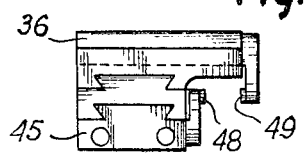
FIG. 3 is an elevation of a threading tool carrier

It will be thereafter shortly dealt about configuration of groove 31 (FIG. 4). On front end 52 of universal control cam 29 groove 31 is bored. Roller 31' rotatably mounted on pin 31" rolls along groove 31 when driving shaft is in motion, inducing carriage 32 to effect to-and-fro horizontal displacement, as pin 31" is rigidly secured on carriage 32. FIG. 4 shows roller 31' in a position corresponding to start point. If universal control cam 29 is turned by an angle $\alpha$, of 20° for example, according to configuration of groove 30 tool 50 comes to working contact with workpiece 51. Cam 29 turning on, roller 31' slides in the length portion corresponding to angle $\beta$, of 240° for example. The mean length of this portion corresponds to maximum threading length which can be operated on workpiece with the attachment according to the invention. Turning cam 29 by an angle $\alpha_1$ equal to angle $\alpha$, tool 50 is disengaged from the workpiece and brought back to its starting position through a path corresponding to angle $\alpha$. Angle $\alpha$ corresponds to a 80° angle above mentioned, angle by which must be turned universal cam 29 in relation to driving shaft 14 when another thread is to be performed.

What is claimed is:

1. In an automatic lathe having a work spindle to carry a workpiece to be screw-threaded, a driving shaft, an auxiliary shaft, an interchangeable gear train, transmission means, a tool carrier and first and second control grooves in operating relation with said tool carrier, said auxiliary shaft being rotated by said work spindle through said interchangeable gear train, and rotating said driving shaft through said transmission means, said first and second control grooves rotating simultaneously with said driving shaft, said first control groove corresponding to back and forth motion of said tool carrier in a direction which is radial to said workpiece, said second control groove corresponding to to-and-fro movement of said tool carrier in a direction which is parallel to said workpiece, a screw-threading arrangement comprising a universal control cam bearing said first and second grooves, said first control groove being located on the periphery of said universal control cam for radial movement of said tool carrier, said second control groove being closed partially spiral-shaped, and located on the front end of said universal control cam, a roller, a carriage, a rotatable guiding disc on said carriage, a guiding groove on said guiding disc, a guiding piston, a thimble fixed on said piston, a connecting rod coupled to said piston, said roller engaging said second partially spiral-shaped control groove, said thimble being guided by said guiding groove of said disc on said carriage, said connecting rod being articulated on said tool carrier.

2. A screw-threading device arrangement as in claim 1 in which the control groove located on the front end of the universal control cam, has its mean length divided in first and second portions, said first portion being spiral shaped and twice as long as said second portion.

3. A screw-threading arrangement as in claim 1 in which the universal control cam can be secured in first and second positions on driving shaft, said first position corresponding to external right hand screw-threading and internal left hand screw-threading, said second position corresponding to internal right hand screw-threading and external left hand screw-threading.

References Cited by the Examiner

UNITED STATES PATENTS

| | | | |
|---|---|---|---|
| 977,527 | 12/1910 | Kirschke | 10—101 |
| 2,399,621 | 5/1946 | Bodmer | 10—101 |
| 2,511,196 | 6/1950 | Cittat | 10—101 |
| 2,698,952 | 1/1955 | Escure | 10—101 |
| 3,090,267 | 5/1963 | Trumpp | 82—5 |

WILLIAM W. DYER, JR., *Primary Examiner.*

H. L. HINSON, *Assistant Examiner.*